United States Patent [19]
Lipp et al.

[11] Patent Number: 5,633,066
[45] Date of Patent: May 27, 1997

[54] HONEYCOMB STRUCTURES HAVING NON-PARALLEL CELLS AND METHOD OF MAKING

[75] Inventors: G. Daniel Lipp, Painted Post; Mallanagouda D. Patil, Corning, both of N.Y.

[73] Assignee: Corning Incorporated, Corning, N.Y.

[21] Appl. No.: 215,294

[22] Filed: Mar. 21, 1994

[51] Int. Cl.$^6$ ........................................ B32B 3/12
[52] U.S. Cl. .......................... 428/116; 428/188; 502/527
[58] Field of Search ................................ 428/116, 118, 428/188; 502/527

[56] References Cited

U.S. PATENT DOCUMENTS

| | | | |
|---|---|---|---|
| 3,006,798 | 10/1961 | Holland | 428/116 X |
| 3,505,030 | 4/1970 | Sowards | 428/116 X |
| 3,983,283 | 9/1976 | Bagley | 428/116 |
| 4,233,351 | 11/1980 | Okumura et al. | 428/116 X |
| 4,777,070 | 10/1988 | Huvey | 428/116 |
| 4,840,827 | 6/1989 | Mizutani et al. | 428/116 |
| 5,393,586 | 2/1995 | Lipp | 428/116 |
| 5,393,587 | 2/1995 | Machida et al. | 428/116 |

*Primary Examiner*—Henry F. Epstein
*Attorney, Agent, or Firm*—Timothy M. Schaeberle; Angela N. Nwaneri

[57] ABSTRACT

The invention relates to an extruded honeycomb structure in which every cross-section is rotationally displaced from other cross-sections. The cells are twisted and as a result, are not parallel with the axis of extrusion. The twisted cells are formed by passing plastically deformable material through a die and twisting or rotationally displacing the extrudate around its central axis to obtain a twisted honeycomb structure.

5 Claims, 6 Drawing Sheets

HONEYCOMB STRUCTURES HAVING NON-PARALLEL CELLS AND METHOD OF MAKING

BACKGROUND OF THE INVENTION

The present invention relates to a cellular structure in which the cells or channels are not parallel to the axis of extrusion or the flow axis. In particular, the invention relates to honeycomb structures having twisted or spiral cells and rotationally displaced cross-sections.

Extruded honeycomb structures are traditionally formed with straight and parallel cells or passages which communicate between opposing inlet and outlet faces of the structure. However, straight and parallel cells are not appropriate for certain applications. In some applications it is desirable to provide a tortuous path for the fluid in order to create pseudoturbulence or enhanced mixing within the channels or passages, or ensure contact of fluid particles with the cell walls. Such non-straight paths lead to more thorough heating and/or cleaning as the case may be, as the fluid will undergo prolonged contact with the heat exchanger, catalyst or filter. For example, in trickle bed reactors, fixed bed reactors, automotive reactors, heat exchangers, NOx abatement reactors and other similar applications such as chemical reactors, it is desirable to have the fluid flow through a distorted (non-straight) path to achieve better contact between the reactants and the cell walls. In the case of a heat exchanger for example, improved contact with the cell walls will result in better heat transfer.

In the past, production of cellular structures having non-parallel channels or cells, for example cross-directional flow structures, has required multiple steps involving basically, a cut and paste approach. However, to the best of our knowledge, there has been no disclosure of an extruded honeycomb structure which, as extruded, comprises non-parallel cells, or of a method of making such structures.

Recently, in co-pending, co-assigned U.S. Ser. No. 08/341,667, now U.S. Pat. No. 5,525,291, a novel method is disclosed for extruding honeycomb structures having cross-directional flow cells by using a movable die in which the lateral or reciprocating movement of the die results in a complex cell alignment.

There continues to be need for non-parallel cell structures and for improved methods for making such structures. Accordingly, it the object of the invention to provide a twisted cell honeycomb structure and method of making same.

SUMMARY OF THE INVENTION

Briefly, the present invention relates to an extruded honeycomb structure having two opposing faces and a matrix of cell walls defining a plurality of cells or channels, in which at least some of the cells are aligned at an angle to the axis of extrusion.

In another aspect, the invention relates to a unitary extruded honeycomb structure having two opposing faces, a matrix of cell walls defining a plurality of cells whose directions or alignments are displaced from the axis of extrusion by angles ranging from 0 to 90°, and at least one cross-section which is rotationally displaced from one of the opposing faces.

In still another aspect, the invention relates to a method of forming a twisted honeycomb structure by passing plastically deformable material through a die to form a honeycomb structure having straight-through cells, and twisting or rotationally displacing the structure around its central axis to form a twisted honeycomb structure.

In yet another aspect, the invention relates to a method of forming a twisted honeycomb structure by providing a die in which the flow passages which form the cell walls are set at angles to the direction of extrusion with the angles increasing with distance from the centerline of the extrusion, such that the emerging extrusion (extrudate) rotates about this centerline without further twisting force being applied.

In still a further aspect, the invention relates to a method of forming a twisted die structure by passing plastically deformable material through a die comprising a ring structure having a set of circumferential cell wall-forming slots and a set of radial cell wall-forming slots, the circumferential cell wall-forming slots being generally parallel to the direction of extrusion, and the radial cell wall-forming slots being at angles to the direction of extrusion such that the angles increase as the distance from the centerline of extrusion increases, such that the material emerging from both the radial and circumferential cell wall-forming slots rotates about the centerline of extrusion to form a twisted honeycomb structure.

As used in this specification:

"non-parallel cells" refers to cells which are at least in some portions not parallel to the axis of extrusion, even though such cells may be parallel to each other;

"continuous extruded structure" refers to a unitary extruded monolith having no seams or joints, that is the structure "as extruded" contains the characteristics or properties described. For example, a continuous extruded cross-flow structure would be a structure which when extruded, exits the extrusion die with cross-directions channels;

BRIEF DESCRIPTION OF THE DRAWINGS

FIGS. 9a and 9b are schematic diagrams illustrating another embodiment of the invention in which a round twisting guide is provided with recessed regions (FIG. 9b), which interlock with corresponding protrusions or projections on the periphery of a round extruded honeycomb structure (FIG. 9a); and FIG. 10 is a schematic diagram of another embodiment of the invention showing the use of rollers to impart a twist to a square extruded structure as it emerges from a standard die.

Reference Numerals in the Drawings

11 . . . twisted cell honeycomb structure;
13 . . . circumferential cell walls;
15 . . . radial cell walls;
17 . . . die of the invention;
19 . . . housing;
21, 23 . . . concentric rings;
25 . . . feed holes;
27 . . . circumferential cell wall-forming slots;
29 . . . radial cell wall-forming slots;
31 . . . base region of a concentric ring;
33 . . . shoulder region of a concentric ring;
35 . . . neck region of a concentric ring;
37 . . . straight cell, square extrudate;
39 . . . standard extrusion die;
41 . . . twisting guide having square cavity;
43 . . . square internal cavity;
45 . . . twisted honeycomb structure having square cross-section;
47 . . . round honeycomb extrudate;
49 . . . projections or protrusions;
51 . . . spiral grooves;
53 . . . round inner cavity;
55 . . . twisting guide having round inner cavity;
57 . . . twisting roller;

DETAILED DESCRIPTION OF THE INVENTION

One primary objective of the invention is to provide enhanced turbulence of fluids passing through the cells of a honeycomb structure so as to achieve greater contact between the fluid and the cell walls. We have found that by replacing the traditional straight cells of existing honeycomb structures with the curvilinear or twisted cells of the present invention, both turbulence and contact can be greatly increased. In the case of chemical reactions where the cell walls are coated with a catalyst, the twisted structure of the invention will result in a greater proportion of the fluid coming in contact with the cell walls and thereby, the catalyst and result in improved chemical reaction.

We have found that the twisted structure can be obtained by any one of several methods described herein. In one particularly useful embodiment, a standard extruded honeycomb monolith having straight flow cells is twisted or rotated around its central axis as the extrudate exits the die and while the extrudate is still wet or deformable. The extrudate can be twisted or rotated around its central axis either while the extrudate is still anchored to the die, or after the extrudate has been cut to its desired length. The amount of twist or rotation which can be achieved before the cells collapse or distort will depend on the extrusion variables such as the plasticity or elasticity of the batch, the batch viscosity, the cell density, cell size, and extrusion diameter.

Figure 1:
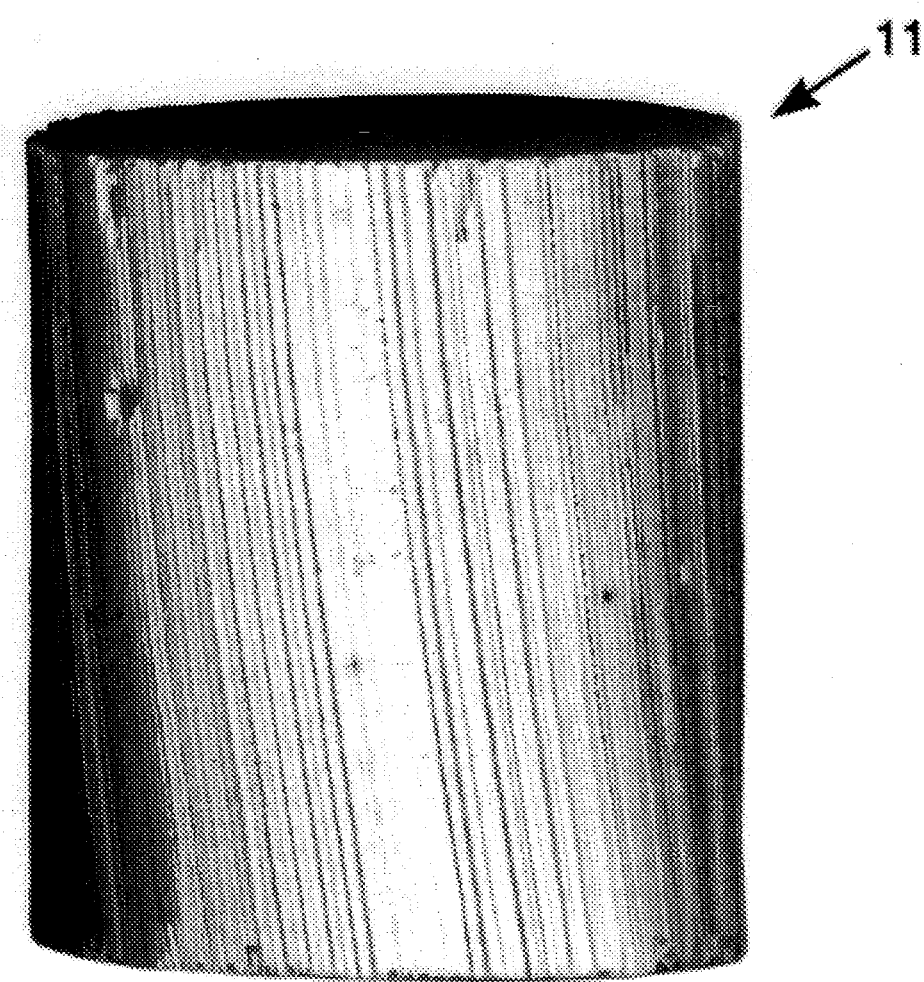
FIG. 1 is a longitudinal view of the twisted honeycomb structure of the invention showing a typical spiral cell path around the central axis of the structure.
Figure 2:
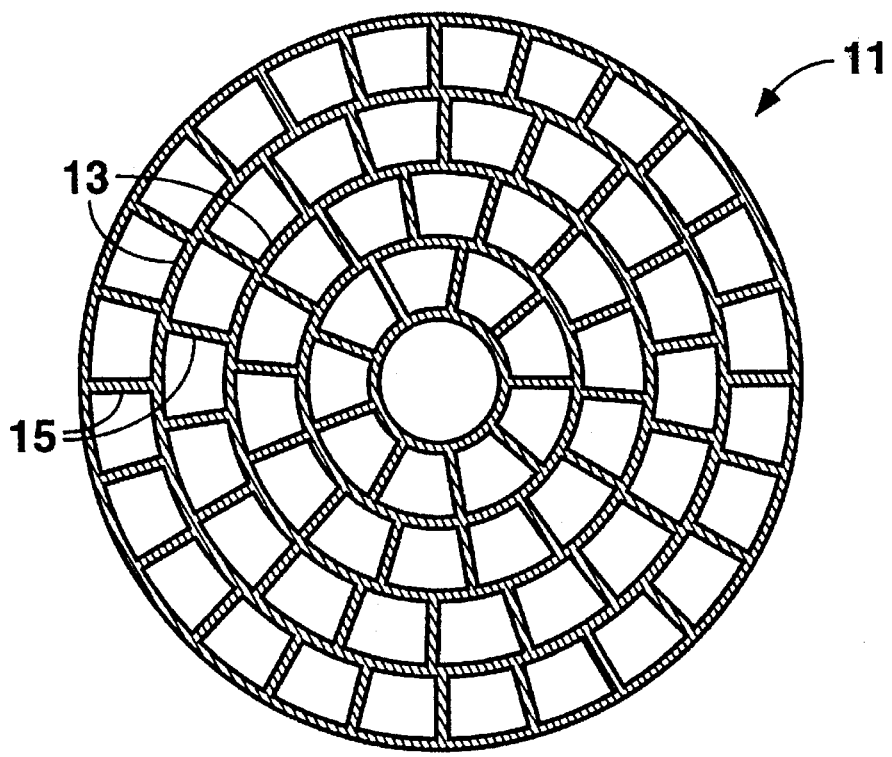
FIG. 2 is a cross-sectional view of the twisted cell structure of the invention where the cell walls are either radial or circumferential relative to the centerline of extrusion.

FIG. 1 is an illustrative example of a cell structure that can be produced using the method of the invention.

FIGS. 2–7 illustrate another embodiment of the invention in which a twisted cell honeycomb structure 11 (FIG. 2), having both circumferential and radial cell walls 13 and 15 respectively, is formed using a die 17 (FIG. 3) in which the flow passages forming the cell walls are set at angles to the direction of extrusion with the angles increasing with distance from the centerline of extrusion, such that the emerging extrudate rotates about the centerline without further twisting force being applied.

Figure 3:
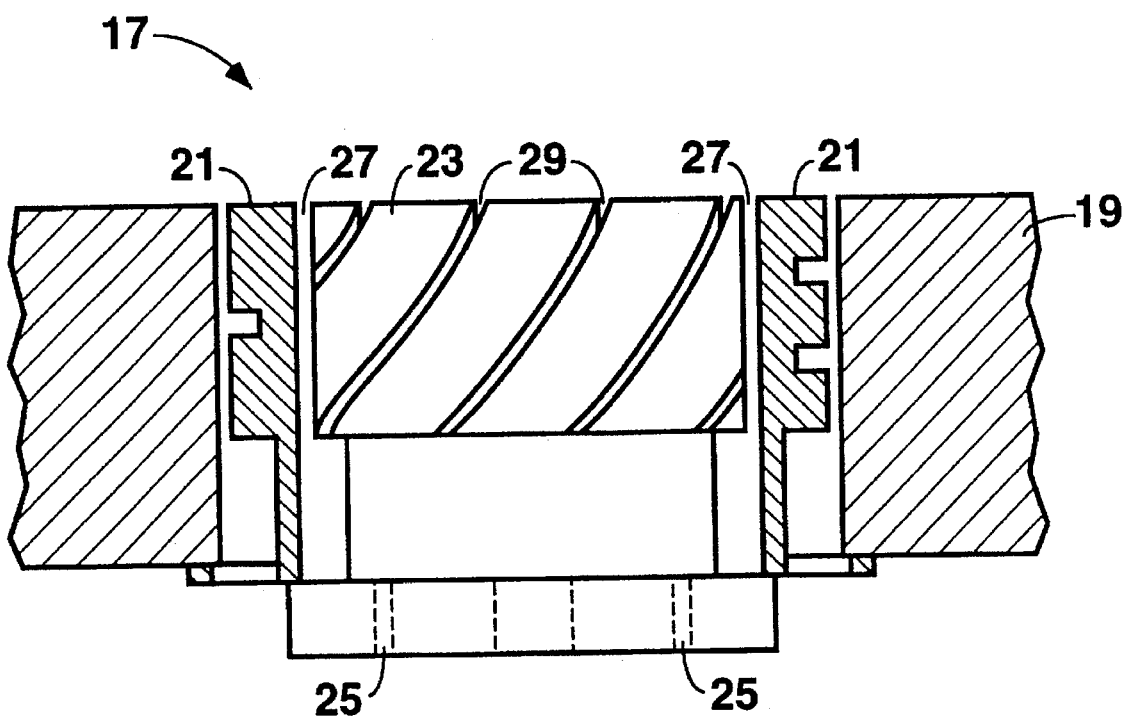
FIG. 3 is a schematic diagram of a die for making the twisted cell structure of FIG. 2, showing a housing, first and second concentric rings, circumferential wall forming slots, and radial wall forming slots.

As shown in FIG. 3, the die 17 is composed of a housing 19 enclosing a plurality of concentric rings (first and second concentric rings 21 and 23 respectively are shown), a plurality of feed holes 25 and two groups of slots—one group of circumferential cell wall-forming slots 27, and a group of radial cell wall-forming slots 29.

Figure 4:
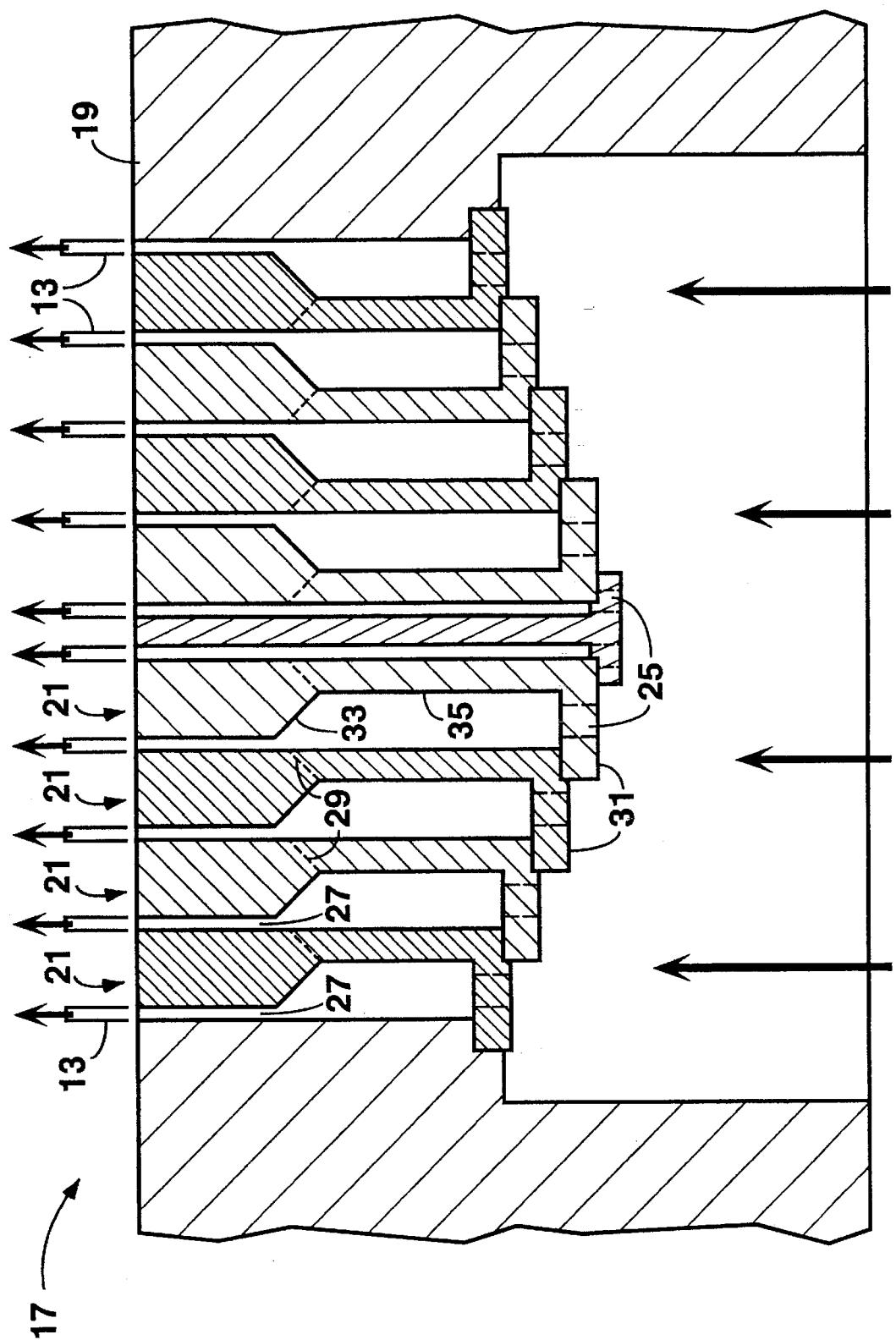
FIG. 4 is cross-sectional view of the die of FIG. 3 showing four concentric rings.

FIG. 4 illustrates a four concentric ring die, showing the circumferential and radial cell wall forming slots 13 and 15. The number of rings may vary depending on the desired complexity and configuration of the resulting twisted honeycomb structure. As shown, the base of each ring is seated in the base of an adjacent ring for support and alignment.

Figure 5:
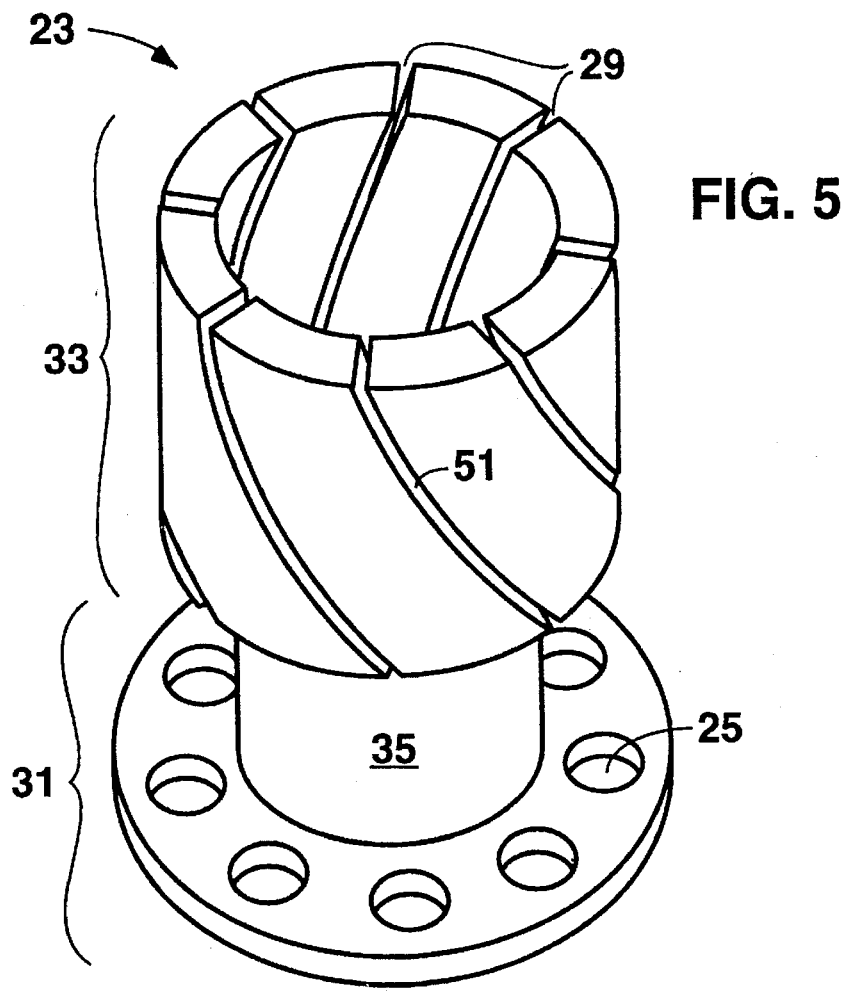
FIG. 5 is a schematic diagram of one of the concentric rings of the die of FIG. 3, showing the feed holes and radial slots.

As shown in FIG. 5, each concentric ring is comprised of a base region 31 having a plurality of feed holes 25, a shoulder region 33 having a plurality of radial wall-forming slots 51, and a neck region 35 separating the base and shoulder regions of the concentric ring.

Figure 6:
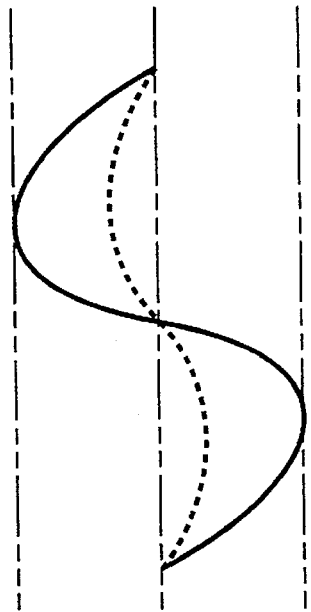
FIG. 6 is a schematic diagram of a section of an extrudate made from the die of FIG. 3, showing two cells.
Figure 5:
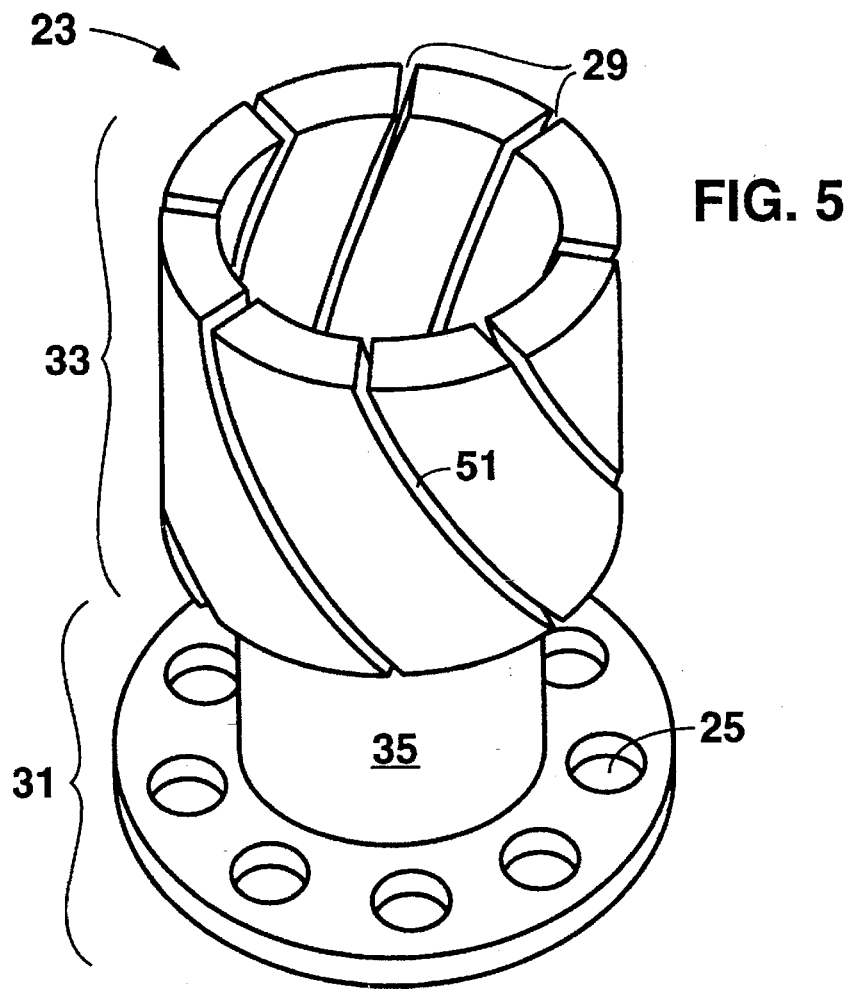
Figure 6:
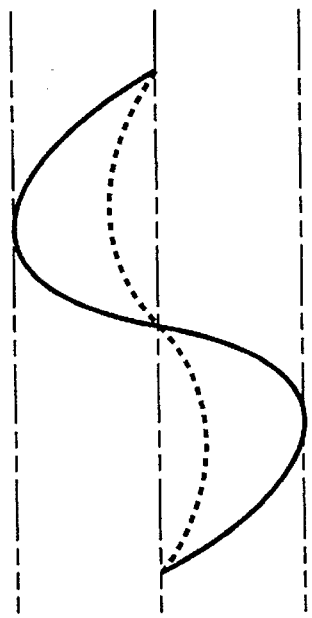
Figure 7:
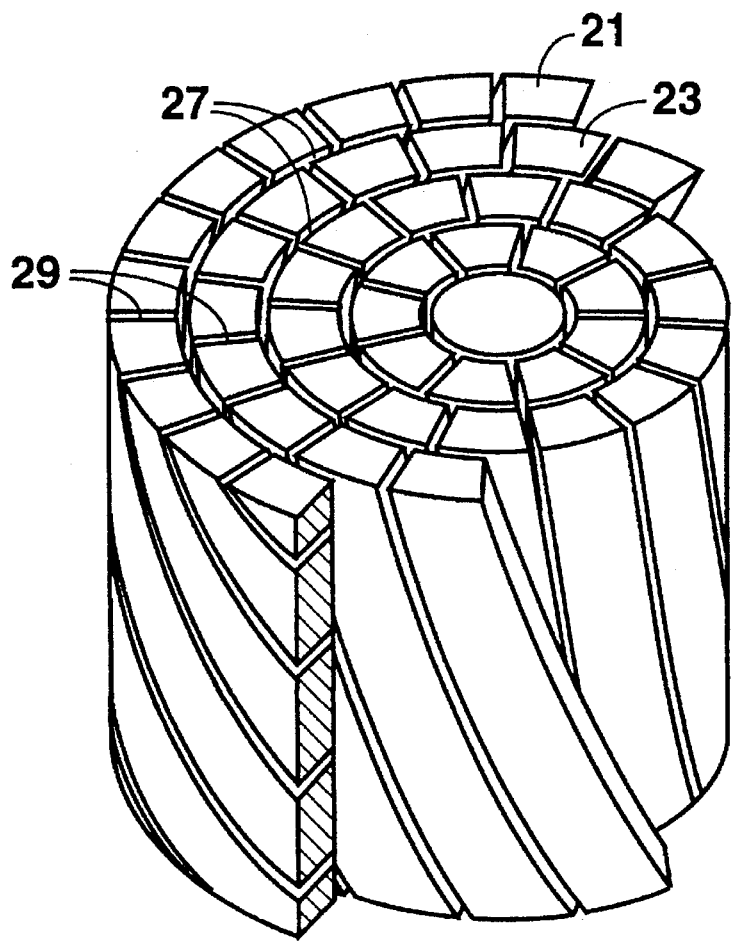
FIG. 7 is a schematic diagram illustrating the differences in the lengths and angles of the outer and inner concentric rings of the die of FIG. 3.

As shown in FIG. 6 the path lengths and angles of the cells formed by the concentric ring die varies from ring to ring. In order to keep the pitch or repeat distance of the cells of each ring the same, the length and angle of the radial wall-forming slots 15 will vary from ring to ring as shown in FIG. 7. In the embodiment illustrated by FIGS. 2–7 above, no external twisting force is required to form the twisted cell structure of the invention as the twisting is caused within the die.

Figure 8:
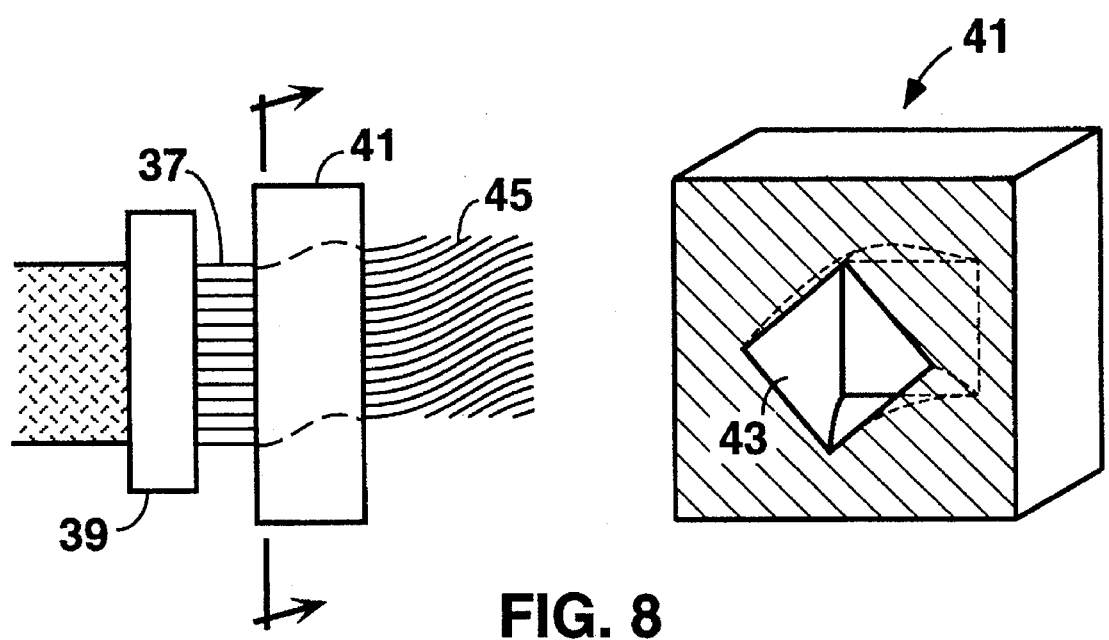
FIG. 8 is a schematic diagram of a square twisting guide through which a square extrudate passes as it leaves the die to form a twisted structure.

In another embodiment (FIGS. 8 and 9), a cellular structure having straight-flow cells 37 is extruded using a standard extrusion die 39, and then twisted around its central axis to rotationally displace the cross-section of the structure. Several methods can be used to apply a twisting force to the extrudate as it emerges from the die. For example, in FIG. 8, a straight cell, square extrudate 37 having a generally square shape is passed through a twisting guide 41 having an inner or internal cavity 43 of generally square cross-section, and which internal cavity 43 is preferably made of a low friction material such as Teflon®. That is, the inner cavity 43 of the twisting guide 41 is formed as a spiral of square cross-section. As the generally square, straight cell extrudate 37 passes through guide 41, the extrudate 37 is forced to twist to produce a continuously twisted honeycomb structure 45. In addition, guides having other shapes can be used to obtain a twisted cell structure of other shapes such as regular and irregular polygons or ovals.

Another method of applying a twisting force to a cellular structure is illustrated in FIGS. 9a and 9b. In this embodiment, an extrudate of a generally round shape 47 may be formed having projections or protrusions 49 radiating outwardly from the periphery of the extrudate 47 as shown in FIG. 9a. Preferably, the projections 49 are spaced equally around the cellular structure. For example, in a structure having two projections, these are preferably formed on opposite sides of the extrudate, about 180° apart. The projections 49 are made to fit into mating spiral grooves 51 in the generally round or circular inner cavity 53 of a twisting guide 55 (FIG. 9b) which thereby imparts a twisting motion to the entire extrudate. In this embodiment, any number of projections may be used. In addition, grooves may be substituted for the projections, which grooves are made to fit onto corresponding mating projections in the twisting guide.

Alternatively, the twisting guides may be replaced with sets of rollers 57 which may be set at angles to the original shape of the extrudate, with the angles increasing uniformly with increasing distance from the die face as shown in FIG. 10. Such rollers 57 may also be used to produce spiral cells which alternate in direction, if the rollers are mounted on a rotating structure which oscillates back and forth, for example.

Other methods may also be employed to impart a twist to extruded honeycomb structures. For example, a certain amount of twist may be achieved by twisting extruded structures while the structure is still wet or deformable.

In addition to twisting post-extruded structures, the same results can be obtained by displacing the die about its central axis and rotating the displaced die about the central axis while the batch is passing through the die. In this embodiment, the die would move rotationally as extrudable material is passed through the die. As with the post-extrusion rotation, the degree of twist which can be achieved before the structure distorts will depend on the batch extrusion properties.

The resulting honeycomb structure having a twisted cell configuration can be dried and sintered using well known methods. Optionally, the formed structure may rigidified immediately after forming using the method described in co-pending, co-assigned U.S. Ser. No. 08/132,923 now U.S. Pat. No. 5,458,834 to Faber et al., herein incorporated by reference. In a particularly useful embodiment, the structure is formed from a soft batch material comprising solid particles, binder and solvent. After extruding the batch into a green twisted honeycomb structure as described above, the extrudate is dried by bringing the formed green body into contact with a drying or hardening medium comprising a liquid in which the solvent is soluble and the solid particles and the binder are insoluble to form a self-supporting, twisted honeycomb structure. The self-supporting structure may then be sintered using conventional methods.

Solid particles or powders useful for the batch material include plastic, metal, carbon, graphite, ceramic powders, precursors and mixtures of these materials. Examples of useful powders include zirconia, titania, silica, hafnia, cordierite, mullite, spinel, magnesia, forsterite, enstatite, (proto)-enstatite, sapphire, carbides, borides, nitrides, rare earth metal oxides, alkaline earth metal oxides, first, second and third transition metal oxides, talc, clay, alumina, soluble salts, silicone, alkoxides, and mixtures of these.

To aid in the forming of the structure and improve the plasticity of the batch, the plastically deformable batch material may also include useful plasticizers, dispersants, flocculants and gellants.

In addition, the batch material may also include a catalyst such that the catalyst is incorporated into the structure. Alternatively, if desired, the structure may be washcoated with catalyst after forming and drying. Useful catalyst for automotive applications include base metals, base metal oxides, noble metals or a combination of these.

Samples of the twisted cell honeycomb structure of the invention were produced using a standard 400 cell per square inch die, having slot widths of about 6 mils. Using this standard die, several twisted honeycomb structures having a 3-inch diameter and about 6 to 10 inches in length were extruded and dried. Generally, the twist obtained was equivalent to one full rotation in about 3–4 feet.

In addition to the embodiments discussed above, it will be clear to persons skilled in the art that numerous modifications and changes can be made to the above invention without departing from its intended spirit and scope.

What is claimed is:

1. An extruded honeycomb structure having two opposing faces and a matrix of cell walls defining a plurality of cells or channels, wherein at least portions of the cells are twisted to provide a honeycomb structure which is rotationally displaced.

2. The honeycomb structure according to claim 1, wherein every cross-section of the structure is rotationally displaced from all other cross-sections.

3. The honeycomb structure of claim 1, wherein at least one cross-section is rotationally displaced from one of the opposing faces.

4. The structure of claim 1, wherein each opposing face is rotationally displaced from the other.

5. The structure of claim 1, wherein at least some of the cells are spiral.

* * * * *